April 9, 1957 W. S. ALTER 2,787,995
COOKER
Filed June 5, 1950 2 Sheets-Sheet 1

Winfield S. Alter
INVENTOR.

BY *Clarence A. O'Brien*
*and Harvey B. Jacobson*
Attorneys

April 9, 1957  W. S. ALTER  2,787,995
COOKER
Filed June 5, 1950  2 Sheets-Sheet 2

Winfield S. Alter
INVENTOR.

BY

United States Patent Office 2,787,995
Patented Apr. 9, 1957

2,787,995

COOKER

Winfield S. Alter, Tulsa, Okla., assignor to Cook 'N' Tools, Inc., Tulsa, Okla., a corporation of Oklahoma Application June 5, 1950, Serial No. 166,168

3 Claims. (Cl. 126—25)

This invention relates to new and useful improvements in cookers and the primary object of the present invention is to provide an outdoor cooking unit for campers and the like including means for supporting utensils, food and the like in a conveniently accessible position.

Another important object of the present invention is to provide a cooker including a pot, a stand for supporting the pot in an elevated position, and novel and improved means for centering and retaining the pot on the stand.

A further object of the present invention is to provide a cooker including a stand and a pot detachably secured to the stand in such a manner as to permit the pot to be quickly and readily removed from the stand in a convenient manner for cleaning.

A still further aim of the present invention is to provide a cooker that is simple and practical in construction, strong and reliable in use, neat and attractive in appearance, small and compact in structure, efficient and durable in operation, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
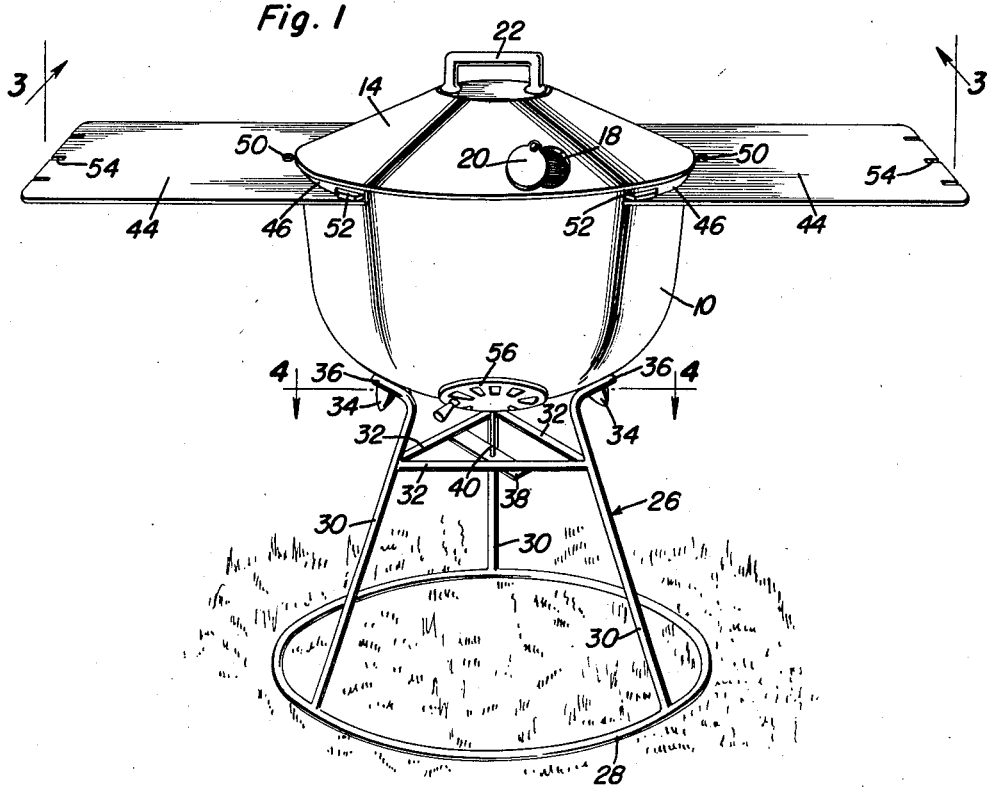
Figure 1 is a perspective view of the present invention.
Figure 2:
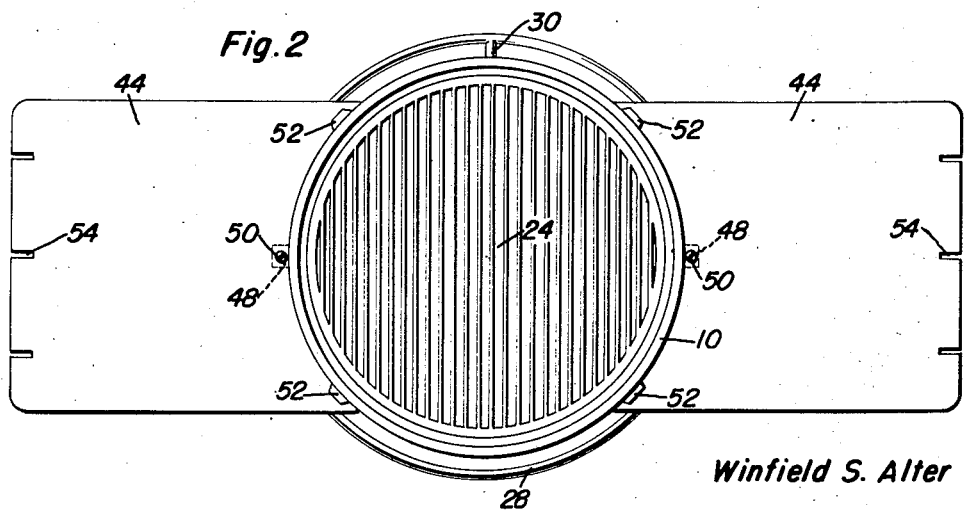
Figure 2 is a plan view of Figure 1, but with the closure removed.

Referring now to the drawings in detail, wherein for the purpose of illustration, there is disclosed a preferred embodiment of the present invention, the numeral 10 represents a metallic pot the upper open end of which receives the depending continuous flanged portion 12 of a closure of lid 14. The lid 14 is also provided with a marginal edge 16 that rests upon the upper edge of the pot.

The lid 14 is provided with an opening 18 and a closure plate or valve 20 is pivoted to the lid and is manually pivoted to close partially or entirely the opening 18. The lid is also composed of a hand grip 22 whereby the lid may be quickly and readily applied to or removed from the pot in a convenient manner.

Figure 3:
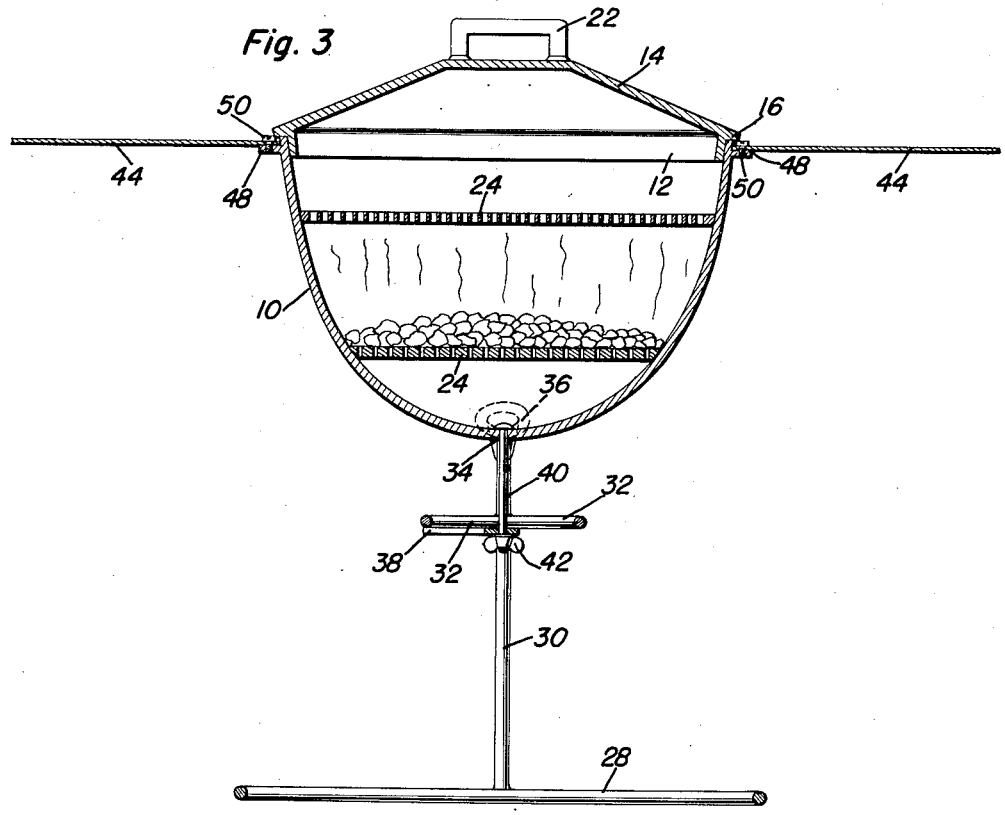
Figure 3 is a vertical sectional view taken substantially on the plane of section line 3—3 of Figure 1.
Figure 4:
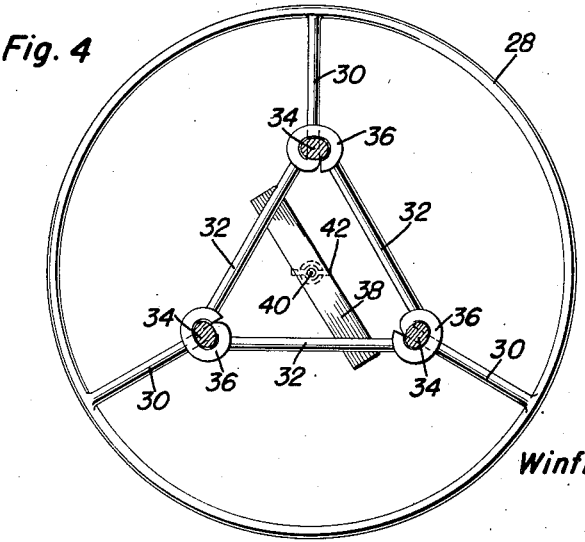
Figure 4 is a horizontal sectional view taken substantially on the plane of section line 4—4 of Figure 1.

One or more grilles 24 are received within the pot 10 and their peripheral edges bear against the side walls of the pot to support the grilles above the bottom of the pot. The grilles vary in diameter, since the side walls of the pot are convexed and are rounded at the bottom of the pot in order to space the grilles parallel to each other as shown in Figure 3.

A stand 26 supports the pot in an elevated position and the stand consists of a wire ring base member 28 and a plurality of upwardly and inwardly inclined arms 30 whose lower ends are permanently attached to the base member 28. Adjacent arms 30 are joined, reinforced and strengthened, adjacent their upper ends, by horizontal cross-bars 32.

Means is provided for centering the pot upon the stand and this means comprises a plurality of conical centering lugs 34 that depend from the pot and which lugs enter vertically inclined eyes 36 formed at the upper ends of the arms 30.

In order to detachably secure the pot on the stand, there is provided a clamping plate 38 that underlies and extends between at least two of the cross-bars 32. A bolt or threaded rod 40 depends from the center of the pot and extends through the plate 38 to receivably engage a nut 42 which when tightened holds the pot against the eyes 36.

Stabilizing means is mounted on the pot, tending to prevent overtipping of the pot and the stand and this means also supports utensils and functions as working space or as a table. This means consists of a pair of horizontal, preferably metallic, walls 44 having inner concave edges 46 that contact the outer periphery of the pot. Fastening ears 48 project from diametrically opposite sides of the pot and support the walls 44. Screws 50 extend through the walls 44 and are threaded in the ears 48.

Pairs of lugs 52 project from the pot 10 between the ears 48 and overlie the walls 44 to prevent sagging of the walls when materials or articles are supported on the walls. The outer edges of the walls 44 are provided with notches 54 that will receive utensils, such as knives or the like.

The pot 10 is provided with a damper structure 56 that is manually actuated to ventilate the pot.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

It is noted the damper is disposed at the bottom of the pot and that preferably charcoal is to be the fuel used in heating material within the pot. Furthermore, by having the lid, fire, smoke and grill all enclosed will allow a much better flavor to be retained and cooked into the meats and any other product processed.

Having described the invention, what is claimed as new is:

1. A cooker comprising a pot open at its upper end, a closure for the pot, a supporting stand for the pot, means centering the pot on the stand, and stabilizing means carried by said pot and preventing overtipping of said pot and said stand, said stand including a plurality of upwardly and inwardly inclined arms, horizontal braces joining adjacent arms, a clamping plate underlying and contacting at least two of said braces, and a bolt depending from said pot and extending through said plate and having a nut threaded thereon and resting against said plate.

2. A portable cooker comprising a pot open at its upper end, a closure for the pot, a stand removably supporting the pot and including a plurality of vertically inclined arms having upper terminal eyes, lugs fixed to and depending from the pot and received in the eyes to center the pot on the stand, horizontal braces joining adjacent arms, a clamping plate underlying and contacting at least two of said braces, and a bolt depending from said pot and extending through said plate and having a nut threaded thereon and resting against said plate to hold the pot against the eyes and the lugs in said eyes.

3. The combination of claim 2 and a pair of elongated utensil supporting horizontal walls having inner end portions removably secured to diametrically opposite sides of the pot and forming stabilizing means preventing over-tipping of said pot and said stand.

References Cited in the file of this patent

UNITED STATES PATENTS

| Number | Name | Date |
|---|---|---|
| 131,030 | Saulson | Sept. 3, 1872 |
| 422,899 | Adams | Mar. 11, 1890 |
| 519,236 | Castleman | May 1, 1894 |
| 1,127,192 | Cox | Feb. 2, 1915 |
| 1,438,345 | Tait | Dec. 12, 1922 |
| 2,021,915 | Hancock | Nov. 26, 1935 |
| 2,094,915 | Dawson | Oct. 5, 1937 |
| 2,172,123 | Ebert | Sept. 5, 1939 |
| 2,189,495 | Lucia | Feb. 6, 1940 |
| 2,349,617 | Gorman | May 23, 1944 |
| 2,501,381 | Dobin | Mar. 21, 1950 |
| 2,541,528 | McAvoy | Feb. 13, 1951 |

FOREIGN PATENTS

| Number | Country | Date |
|---|---|---|
| 480,758 | France | Sept. 21, 1916 |